US009648173B2

(12) United States Patent
Cheuk et al.

(10) Patent No.: US 9,648,173 B2
(45) Date of Patent: *May 9, 2017

(54) METHOD AND SYSTEM TO PROVIDE NETWORK STATUS INFORMATION TO A DEVICE

(75) Inventors: Ho Yin Cheuk, Bridgewater, NJ (US); Lixia Yan, Bedminster, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 453 days.

This patent is subject to a terminal disclaimer.

(21) Appl. No.: 13/409,913

(22) Filed: Mar. 1, 2012

(65) Prior Publication Data

US 2013/0231080 A1 Sep. 5, 2013

(51) Int. Cl.
H04M 15/00 (2006.01)
H04M 17/00 (2006.01)
(Continued)

(52) U.S. Cl.
CPC ..... *H04M 15/765* (2013.01); *H04M 15/7652* (2013.01); *H04M 15/83* (2013.01); *H04M 15/842* (2013.01); *H04M 15/844* (2013.01); *H04M 15/846* (2013.01); *H04M 15/848* (2013.01); *H04M 15/852* (2013.01); *H04M 17/02* (2013.01); *H04M 17/20* (2013.01); *H04M 17/202* (2013.01); *H04M 17/204* (2013.01); *H04W 4/24* (2013.01); *H04L 12/1407* (2013.01); *H04L 12/1417* (2013.01); *H04L 12/1435* (2013.01); *H04L 12/1439* (2013.01)

(58) Field of Classification Search
CPC ............ H04M 15/765; H04M 15/844; H04M 15/848; H04M 15/842; H04M 17/204; H04M 15/852; H04M 17/02; H04M 15/83; H04M 15/7652; H04M 15/846; H04M 17/202; H04M 17/20; H04W 4/24; H04L 12/1435
USPC .............................. 455/405, 406; 379/112.04
See application file for complete search history.

(56) References Cited

U.S. PATENT DOCUMENTS

2002/0022472 A1\* 2/2002 Watler .................. G06Q 20/32
 455/405
2008/0107067 A1\* 5/2008 Baek et al. .................... 370/328
(Continued)

OTHER PUBLICATIONS

ETSI TS 124 008v10.3.0 (Jun. 2011).\*
(Continued)

*Primary Examiner* — Joseph Dean, Jr.

(57) ABSTRACT

Network status information is provided to a mobile device. The data usage of the mobile device is tracked. A data usage criterion is determined from an account for the mobile device. The account information is stored on at least one server. The data usage is compared with the data usage criterion. Based on the comparison, it is determined whether the data usage meets the data usage criterion. Upon determining that the data usage meets the data usage criterion, a notification message is sent to the mobile device in real time through an information element field within an existing message in a bearer channel of the wireless packet data communication network. The notification message may instruct the mobile device to prevent generation and/or transmission of automatic network access requests while allowing user-initiated network access requests.

20 Claims, 9 Drawing Sheets

(51) Int. Cl.
*H04M 17/02* (2006.01)
*H04W 4/24* (2009.01)
*H04L 12/14* (2006.01)

(56) References Cited

U.S. PATENT DOCUMENTS

| | | | |
|---|---|---|---|
| 2011/0151831 A1* | 6/2011 | Pattabiraman | H04L 12/14 |
| | | | 455/405 |
| 2011/0202612 A1* | 8/2011 | Craig | H04L 63/0892 |
| | | | 709/206 |
| 2011/0228734 A1* | 9/2011 | Laganier | H04L 29/12283 |
| | | | 370/329 |
| 2012/0094631 A1* | 4/2012 | Pattabiraman | 455/405 |
| 2012/0278472 A1* | 11/2012 | Ellis | H04L 12/1407 |
| | | | 709/224 |

OTHER PUBLICATIONS

"Policy charging and rules function", Wikipedia, Downloaded on Dec. 22, 2011, p. 1, http://en.wikipedia.org/wiki/Policy_charging_and_rules_function, Wikimedia Foundation, Inc.
"System Architecture Evolution", Wikipedia, Downloaded on Dec. 22, 2011, pp. 1-7, http://en.wikipedia.org/wiki/System_Architecture_Evolution, Wikimedia Foundation, Inc.
"The LTE Network Architecture I Strategic White Paper", 2009, pp. 1-23, Alcatel•Lucent.
"Diameter (protocol)", Wikipedia, Downloaded on Dec. 30, 2011, pp. 1-9, http://en.wikipedia.org/wiki/Diameter_(protocol), Wikimedia Foundation, Inc.

* cited by examiner

| PCO (Max 253 octets Total) | Values |
|---|---|
| Container Identifier | FF00H |
| Container Content (Restricted to Max 50 octets) | MCCMNC; APP; ACTION; [ACTION-OPTS] |
| Container Content Format | Values |
| MCCMNC (3 octets - TBD) | 311480 (VZW) |
| APP (1 octet) | 1 – Prepaid, 2 – Usage Control, 3 – Real Time Reporting (RTR), 4 - 255 – Reserved for Other APP |
| ACTION (1 octet) | 0 – Normal, 1 – Terminate, 2 – Restrict Access, 3 – Redirect, 4 – QoS Change, 5 – 255 – Reserved for Other Actions |
| ACTION-OPTS (10 octets) | If ACTION=0, No OPTS<br>If ACTION=1, No OPTS<br>If ACTION=2, OPTS=DenyAll \| AllowAll – Foreground Only<br>If ACTION=3, OPTS=PROVIDER-ID e.g. COMPANY A<br>If ACTION=4, OPTS=RATELIMIT (kbps) e.g. 640<br>If ACTION=5, No OPTS |

*FIG. 3*

METHOD AND SYSTEM TO PROVIDE NETWORK STATUS INFORMATION TO A DEVICE

BACKGROUND

In recent years, mobile wireless communications have become increasingly popular. Initial implementations of mobile wireless communications, for example in the form of cellular telephone networks, supported circuit switched voice communication services. The carriers developed short message service (SMS) technology to provide text and/or e-mail communications via the wireless communication networks. As the public wireless communication networks have evolved to provide greater bandwidth and packet based services, the industry has developed a variety of data services, such as web browsing, as well as a variety of services using multimedia message service (MMS) technology.

Wireless packet data communication is being provided with ever increasing transmission speed. The packet data communication allows mobile device users to expand the scope of their use of the mobile device, for example, to enjoy multimedia services at a speed comparable to those enjoyed via Internet connected personal computers (PCs).

As the packet data communication has become prevalent, multiple forms of payment for networked data communication services have evolved. Multiple account options with varying amounts of data usage, call time, quality of service and bandwidth allowable are available as postpaid and prepaid communications services. Prepaid service, in which a customer or subscriber has fixed availability of usage of a voice or data resource, is becoming as popular as postpaid options.

User accounts supporting data services, alone or in addition to voice and messaging services, now encompass a vast majority of mobile wireless communications accounts. Prepaid accounts have limits set by the amounts of usage purchased by the users; however, even postpaid accounts may have significant usage thresholds, e.g., beyond which the users pay higher rates per usage. Using the example of a prepaid wireless service, the customer may purchase discrete blocks of time or amounts of data for making voice telephone calls or data communication via a cellular telephone network, and then purchases a new block or amount of data when the previously purchased block or amount is consumed. If additional data is not purchased at this point, service to the device is terminated. Alternatively, a customer may use a postpaid model in which a fixed fee is applied for using a certain amount of a resource within a certain time cycle (e.g., an amount of data or a number of minutes or messages within a month) and which, if used up, may entail a further fee for each use of further resources.

Upon connecting to the wireless communications network, the customer account is authorized and authenticated, and the network allows a voice or data call to proceed. For a prepaid account, the network monitors the customer's usage time or data and decrements from the customer's account. If the account becomes depleted or reaches billing cycle limits, the system can either prompt the customer to purchase more time or data, or the system can terminate the call. Another prepaid and postpaid plan option, however, enables the customer to budget an amount of airtime that will be used during a certain period of time, insuring that the budget will not be exceeded unless the customer desires more airtime. For example, a customer may opt to limit wireless communication airtime for specific phones in the plan (e.g., to prevent exceeding budgets allocated for their child). A similar plan may be offered for data communications, e.g. with a set limit on the amount of data.

In another aspect, since many recent packet data communication users are young users, parents of the young users may like to keep track of and control usage of packet data communications of their children. As a way to control usage of data communication by their children, the children/parents may want to be notified when the child has reached the subscription plan limit (which may be prepaid or postpaid).

To address these needs for people to receive notifications of reaching a subscription plan limit or other pre-set usage limit, some wireless communication service providers attempt to provide notifications of reaching the limit to the customers. The wireless communication service providers, however, do not provide immediate notice of reaching a subscription plan limit. Typically, the amount of use with respect to the subscription plan limit is checked after the end of each data communication session or each billing cycle. Further, these notifications typically rely on short message service (SMS) communication, which is not reliable. In this regard, SMS does not provide for feedback from the receiving mobile device to acknowledge receipt of the notification transmission. When the mobile device is turned OFF or is out of reach from signaling towers, the mobile device may never receive status notifications. Thus, even if a notification were sent from a billing server, it may not be successfully received by the mobile device.

Accordingly, when an account limitation is reached, the mobile device may not be aware that it no longer has data/voice access. Thus, the mobile device may continue pinging the network to request access, thereby causing significant overhead in terms of network and communication resources. Even if the mobile device may receive an account notification, there is currently no means from preventing applications of the mobile device from attempting to connect to the network. As mobile devices are becoming "smarter" by introducing an ever increasing amount of features which make use of the network, the network resource problem of blocking communication requests with the network is further exacerbated.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 illustrates exemplary information content for specific fields of a protocol configuration option.

DETAILED DESCRIPTION

Figure 1:
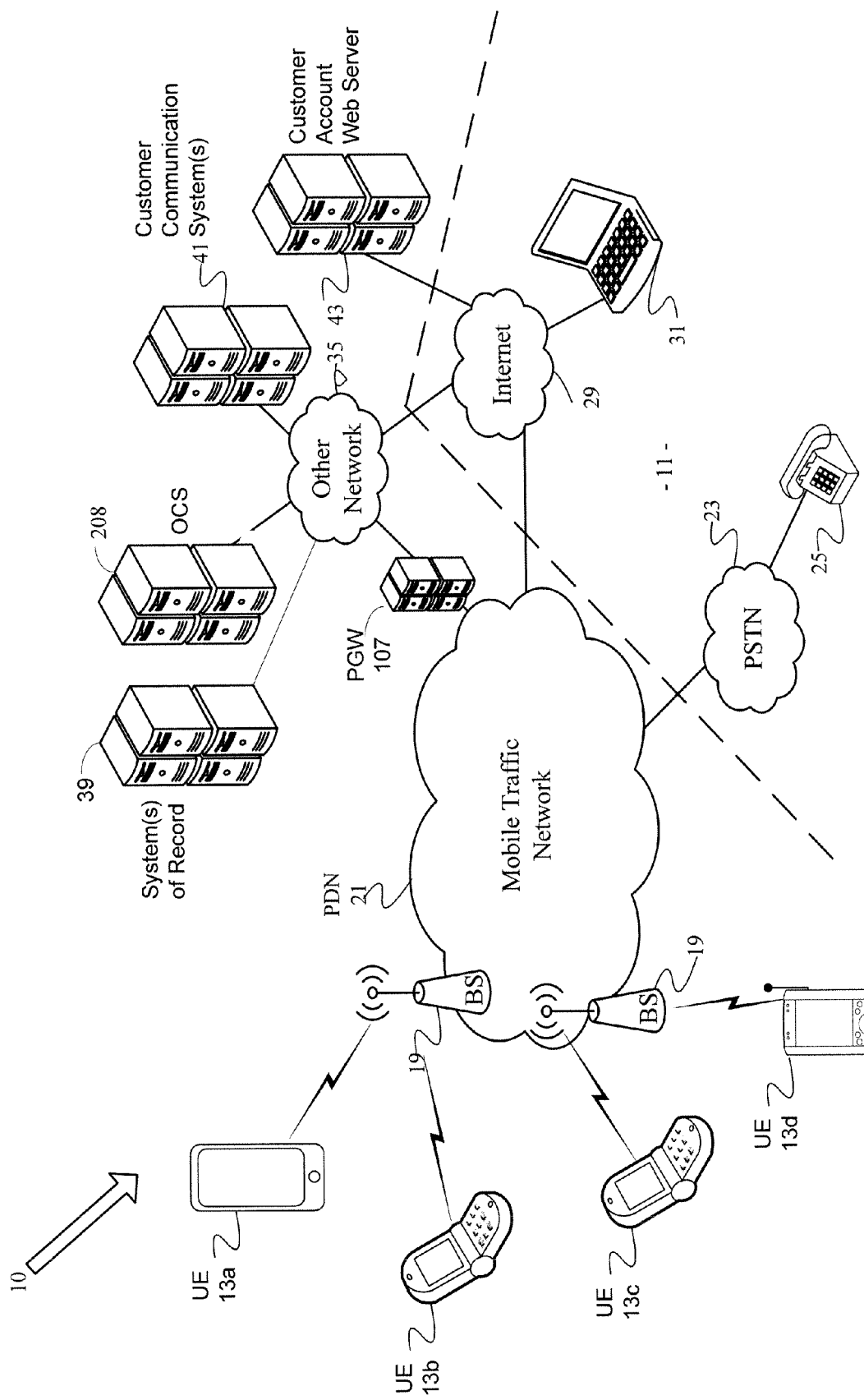
FIG. 1 illustrates a wireless packet data communication network for providing mobile communications for mobile devices as well as a system providing a framework for monitoring mobile device network usage and providing status information to the mobile device.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

The various examples discussed below enable sending notice to a mobile device and/or its user of the level of usage versus the amount limit set under their subscription plan. In one aspect, the mobile device user is notified upon meeting at least one criterion with respect to data usage via a wireless communication network. One such criterion is having met or exceeded a data usage threshold. In another example, a criterion is a data usage threshold that is set below the maximum limit to provide the user some advance warning. An account of the mobile device user has predetermined criteria such as a maximum subscription plan limit or other criteria defined by a user's plan and data usage balance reflecting an amount of data usage remaining under the plan. If at least one criterion (e.g., threshold level of data usage) is met, a notification message to the mobile device is sent in real time through an information element field within an existing message in a bearer channel of the wireless packet data communication network.

The notification message may also provide instructions to configure the mobile device to prevent the device from automatically pinging (e.g., attempting to connect to) the network for communication, by preventing generation and/or transmission of the signal. Such blocking and/or deactivating automatic network access preserves network and communication resources. Further, it reduces mobile device battery consumption. User initiated access attempts may be permitted, although they may be redirected so as to prompt the user to increase the usage limit, e.g., by purchasing more usage under a prepaid account plan. Accordingly, the instructions in the notification message configure the mobile device to deactivate or block automatic network access requests and allow user initiated network access requests.

In one example, when the data usage meets a predetermined criterion, a notification message is sent to the user's mobile device during the respective data session and an option to change subscription plans is provided. For example, the notification message may be provided on a user interface of the mobile device. For example, the notification message may be provided in the form of a visual or an audible prompt. In one example, the options are provided as pop-ups on the user interface.

The criterion may be set by the mobile device user, the service provider, or an account holder (who may or may not be the mobile device user—e.g., a parent or relative of the mobile device user). The criterion may include multiple thresholds. In this regard, multiple notification messages each of reaching a different one of the thresholds may be sent to the mobile device in real time, at the time when the data usage has reached the threshold. The criterion can also be with respect to different aspects of the user's plan: for example, voice call minutes or data volume downloaded to the mobile device, and the date/time at which the network can be accessed. Further, the criterion and the respective notification may be different for a prepaid and a postpaid account.

The notification message of the data usage having met a predetermined criterion is sent to the mobile device in real time to allow the user to provide an opportunity to remedy the criterion and again restore full communication ability. For example, the notification message of having exceeded a threshold level of data usage may allow the user to use an appropriate new subscription plan, which could be prepaid or postpaid, or replenish the data allocation for the billing plan. The user may be able to replenish their account by purchasing more credits (e.g., recharge the account). A user may update their subscription plan by selecting a different quality of service (QoS) or a different plan from the provider. If the status of having met a predetermined criterion of data usage is not cured, the mobile device may be prevented from accessing the network. Preventing access to the network from the root (at the mobile device level) instead of being rejected by the network reduces the demand on the network and communication resources.

Reference now is made in detail to the examples illustrated in the accompanying drawings and discussed below. FIG. 1 illustrates a number of mobile devices, a mobile communication network coupled to other communication networks and several systems/elements associated with or included in the mobile network for various functions as may be involved in monitoring mobile device data usage, determining status of usage with respect to plan limits and providing real time notification messages.

Hence, FIG. 1 illustrates a mobile communication network 10 as may be operated by a carrier or service provider to provide a wide range of mobile communication services and ancillary services or features to its subscriber customers and associated mobile device users. The elements generally indicated by the reference numeral 10 generally are elements of the network and are operated by or on behalf of the carrier, although the mobile devices typically are sold to the carrier's customers. The mobile communication network 10 provides communications between mobile devices as well as communications for the mobile devices with networks and stations 11 outside the mobile communication network 10.

For purposes of later discussion, several mobile devices appear in the drawing, to represent examples of the mobile devices that may receive various services via the mobile communication network 10. Today, mobile devices typically take the form portable handsets, smart-phones, tablet computers or personal digital assistants (PDAs), although they may be implemented in other form factors, including consumer and business electronic devices. The mobile devices 13a, 13b, 13c, and 13d, for example, may take the form of a mobile telephone station, enhanced with display and user input capabilities to support certain text and image communications, such as email, picture communication and web browsing applications.

Figure 2:
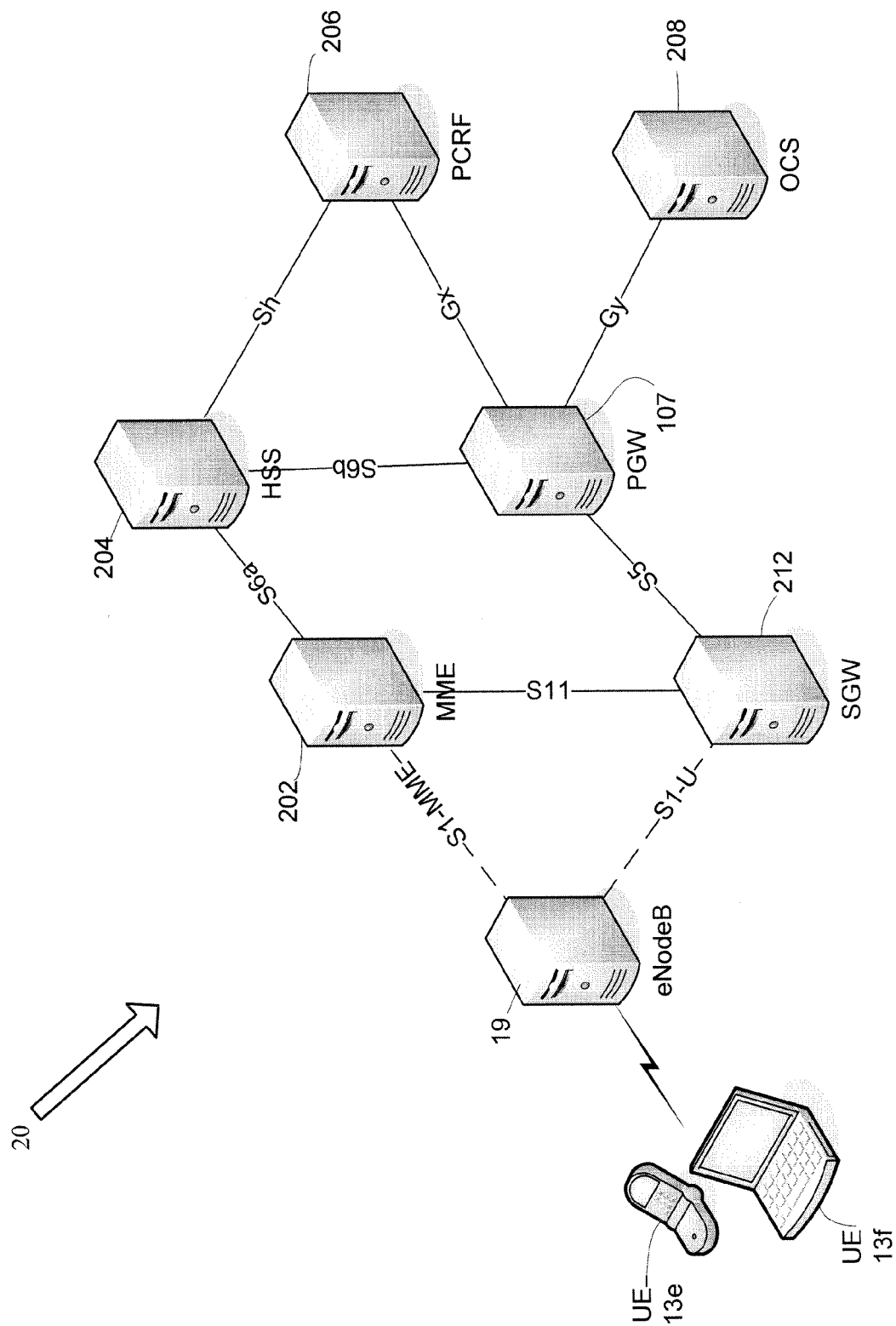
FIG. 2 illustrates a high level interface block diagram depicting an exemplary system which provides network usage notifications to a mobile device.

In another example, as illustrated in FIG. 2, mobile device 13f is a portable computing device, specifically, comprising a wireless modem card inserted into a handheld or laptop personal computer (PC) or the like. Alternatively, the PC may connect to a handset device, similar to the handset type mobile device 13a. The mobile device 13a includes a wireless transceiver compatible with the particular type of packet data service offered by the system 10. For discussion of one usage notification message example and the associated exemplary notification service, we assume that the mobile devices 13*a*, 13*b*, 13*c*, 13*d*, 13*e*, and 13*f* are all covered under one subscriber account, and that among those stations, the mobile device 13*a* is the station of the account holder (AH).

Returning to FIG. 1, the network 10 allows users of the mobile devices to initiate and receive telephone calls to each other as well as through the public switched telephone network (PSTN) and telephone stations connected thereto. The network 10 allows SMS type text messaging between mobile devices and similar messaging with other devices via the Internet. The network 10 typically offers a variety of other data services via the Internet, such as downloads, web browsing, e-mail, etc.

The mobile communication network 10 typically is implemented by a number of interconnected networks. Hence, the overall network 10 may include a number of radio access networks (RANs), as well as regional ground networks interconnecting a number of Radio Access Networks (RANs) and a wide area network (WAN) interconnecting the regional ground networks to core network elements, such as the Multimedia Messaging Service Centers (MMSCs). A regional portion of the network 10, such as that serving mobile devices 13*a* to 13*f* will typically include one or more RANs and a regional circuit and/or packet switched network and associated signaling network facilities.

Physical elements of a RAN, operated by one of the mobile service providers or carriers, include a number of base stations represented in the example by the base stations (BSs) 19. Such base stations 19 typically comprise a base transceiver system (BTS) which communicates via an antennae system at the site of base station and over the airlink with one or more of the mobile devices 13*a* to 13*f* when the mobile devices are within range. Each base station 19 typically includes a BTS coupled to several antennae mounted on a radio tower within a coverage area often referred to as a "cell." The BTS is the part of the radio network that sends and receives RF signals to/from the mobile devices that the base station currently serves.

The radio access networks also include a traffic network represented generally by the cloud at 21, which carries the user communications for the mobile devices 13*a* to 13*f* between the respective base stations 19 and other elements with or through which the mobile devices 13*a* to 13*f* communicate. Individual elements such as switches and/or routers forming the traffic network 21 are omitted here form simplicity.

The traffic network portion 21 of the mobile communication network 10 connects to a public switched telephone network (PSTN) 23. This allows the network 10 to provide voice grade call connections between mobile devices and regular telephones connected to the PSTN 23. The drawing in FIG. 1 illustrates one such telephone at 25. The PSTN 23 also provides connections to other types of customer premises equipment, such as facsimile or 'FAX' machines (not shown).

The traffic network portion 21 of the mobile communication network 10 connects to a public packet switched data communication network, such as the network commonly referred to as the "Internet" shown at 29. Packet switched communications via the traffic network 21 and the Internet 29 may support a variety of user services through the network 10, such as mobile device communications of text and multimedia messages, e-mail, web surfing or browsing, programming and media downloading (including audio and video), etc. For example, the mobile devices may be able to receive messages from and send messages to user terminal devices, such as personal computers, either directly (peer-to-peer) or via various servers (not separately shown). The drawing shows one such user terminal device as a personal computer (PC) 31 or servers 31, by way of example. For purposes of discussing notification messages, some notifications may entail an e-mail message transmission of the notification to the account holder's terminal, such as to the PC 31 via the Internet 29.

Of note for purposes of this discussion, many of the network usage notification messages discussed herein are sent to various mobile devices using the packet data network (PDN) 21. The Evolved Packet Core (EPC) of network 21 uses the concept of Evolved Packet System (EPS) bearer channels to route IP traffic from a gateway 107 in the network 21 to the mobile device (e.g. 13*a* to 13*f*). A bearer channel is an IP packet flow with a defined quality of service (QoS) between the Packet Data Network (PDN) Gateway (PGW) 107 and the mobile device (e.g., 13*a* to 13*f*). It is within these packets that notification messages to a mobile device (13*a* to 13*f*) are sent. For example, when a mobile device 13*a* has met a predetermined account criterion, e.g., has depleted an account balance, the network 10 provides a notification message in an information element field within an existing message from the network 21 to the device (e.g., 13*a* to 13*f*). In one example, the notification message is embedded in the protocol configuration option (PCO) in the message to the device through the bearer control plane. For example, the network provides a notification message, options to replenish/change the account, and possible instructions to prevent subsequent pinging to the network 21. The PCO is an information element field within the existing message from the network 21 to the device (e.g., 13*a* to 13*f*). Thus, the PCO may be used to provide having met certain criterion-related information and/or the instructions to the mobile device in connection with account network usage and possible further related action, like preventing further automatic pinging originating from the mobile device.

For example, this notification message may be transmitted in real time. In some cases, the network 10 may also send a notification message to the mobile device of one or more other users on the account. Hence, in our example, when any mobile device (e.g., 13*b*) meets a predetermined account criterion, the network 10 might also provide a notification message in the form of a PCO message sent via the gateway 107, the traffic network 21, one of the base stations 19 and a signaling channel over the air link to the remaining mobile devices (e.g., 13*a*, 13*c*, and 13*d*).

The carrier also operates a number of systems that provide ancillary functions in support of the communications services provided through the network 10, and those elements communicate with other nodes/elements of the network 10 via one or more private IP type packet data networks 35 (sometimes referred to as an Intranet). The support elements, for example, include one or more systems of record, such as the system shown at 39. For example such a system 39 may include subscriber account records. A large carrier typically has a number of such systems, and the system that stores the account data for a particular subscriber may be referred to as the "system of record" for that subscriber's account.

Some of the users of the mobile devices will subscribe to voice and/or data services under one or more post-pay service plans offered by a carrier or service provider. However, the users or subscribers of other stations will subscribe to voice and/or data services under a plan, in which they pay in advance for an amount of communication service usage. In the examples, usage is measured by duration, e.g., length of time of a voice call, length of time of a data communication session, volume of the consumed data, and/or simply packets of data communicated with a guaranteed QoS supporting real-time communications of an appropriate bandwidth.

For example, the online charging system (e.g., OCS 208) provides the notification message to a mobile device (e.g., 13a to 13f) in the form of a PCO in the bearer channel. The notification message is sent substantially at the time the data usage meets a predetermined criterion. The PCO, in one embodiment, is a type 4 information element with a minimum length of 3 octets and a maximum length of 253 octets (see, e.g., 3GPP TS 24.008 V10.3.0). For example, the PCO may include the following information to a mobile device (e.g., 13a to 13f):

0001H (P-CSCF IPv6 Address);
0002H (IM CN Subsystem Signaling Flag);
0003H (DNS Server IPv6 Address);
0004H (Policy Control rejection code);
0005H (Selected Bearer Control Mode);
0006H (Reserved);
0007H (DSMIPv6 Home Agent Address);
0008H (DSMIPv6 Home Network Prefix);
0009H (DSMIPv6 IPv4 Home Agent Address);
000AH (Reserved);
000BH (Reserved);
000CH (P-CSCF IPv4 Address);
000DH (DNS Server IPv4 Address);
000EH (MSISDN);
000FH (IFOM-Support);
0010H (IPv4 Link MTU); and
FF00H to FFFFH reserved for operator specific use.

In one example, where a predetermined criterion is met, the container identifier inside the PCO is set to one of the reserved fields FF00H to FFFFH to provide usage information to the mobile device in the notification message. Further, the container identifier fields FF00H to FFFFH can be used to provide instructions to the mobile device 13 to deactivate, block, or restrict the network pinging by the mobile device 13.

FIG. 3 illustrates exemplary information container content for fields FF00H to FFFFH that is tailored for each specific mobile device (e.g., 13a to 13f). For example, by specifying ACTION=2, the mobile device may be denied network access except for IP addresses which allow a change or replenishment of the subscription plan, once an account criterion is met. In another example, an ACTION=3, redirects the mobile user to a site in connection with a specific provider, while denying any other network access. For a prepaid phone situation, the user of the mobile device may be redirected to the site of the prepaid phone provider, such that the user can replenish or update their mobile device account. For example, the user can replenish their account by purchasing more credits (e.g., recharge the account). As to updating their account, a user may change the QoS or change to a different plan from the provider. The user of the mobile device can generally access replenishment web-sites even when an account criterion is reached (e.g., in either ACTION=2 or 3).

A method of notifying the mobile device regarding data usage can include the steps of tracking an amount of data usage being used by the mobile device. This tracking may occur at the PGW server 107 communicating with the mobile device through the mobile network 21. It can then be determined, from the user account for the mobile device a first data usage limit and a first data usage time frame. For example, the time frame may be the time of day/week (e.g., 6 a.m. to 6 p.m.; Monday to Friday or weekend). The user account information typically is stored on the server, such as OCS server 208. The OCS server 208 can then determine whether a criterion is met by comparing the amount of data usage to the first data usage limit and comparing a present time to the first data usage time frame. In this regard, there may be "time of day" restrictions. From this comparison, a data usage amount for the first data usage time frame is determined. Consequently, it can be determined whether the data usage amount exceeds the first data usage limit. Upon determining that the data usage amount meets a criterion (e.g., is equal to or exceeds the first data usage limit in the first data usage time frame), then the system sends a notification message to the respective mobile device. Additionally, one or more data usage limits may be compared to other usage limits. For example, a second criterion may be related to time of day/week; volume; communication with specific telephone numbers or sites; and the like. For example, there may fewer or even no restrictions at nights or weekends. Further, certain phone numbers or web sites may be blocked by the account holder. If the second data usage limit meets a respective predetermined usage criterion, the OCS server 208 provides a notification message to the mobile device. For example, the account holder may specify on the customer account web server 43 that the first notification message should be sent to the respective mobile device that has met the first account criterion (e.g., data usage limit) while the second notification message may be sent to all mobile devices on the account. In another example, all notification messages are sent to the account holder and the respective mobile device that has met an account criterion.

In one example, the notification message provided by the OCS server 208 in connection with meeting a predetermined account criterion (e.g., exceeding a usage data limit) includes a suggestion to change or replenish the subscription plan. This type of suggestion can be applied to either or both prepaid or postpaid subscription plans. The notification message in connection with meeting a predetermined account criterion may be different depending on whether the subscription plan is prepaid or postpaid. Thus, the notification message can be specialized to the type of subscription plan. The mobile device may include one or more clients (e.g., application programs) that run on the mobile device and that are configured to receive input and/or instructions from the OCS server 208 through the network 21. In one example, a client triggers a pop-up message on the mobile device 13a offering different subscription or replenishment options. For example, the user may be notified that their account has run out of money, has reached a data limit, or is under a data restriction. An option may be provided to allow the user of the mobile device (e.g., 13a) to suspend their service, or the service of individual mobile devices under the user's account (e.g., 13a to 13f), until the next billing cycle rolls around so the account does not enter into overages. Further, a client deactivates the mobile device communication capability with the network. The deactivation may be performed by the same client that triggers the pop-up message or a separate client. The client receives deactivation instructions from the notification message. In one example, all automatic (not manually/user-triggered) communication requests from applications on the mobile device are deactivated by the client blocking the IP stack with respect to internet traffic. Thus, automatic pinging of the network is prevented unless in response to a request to communicate with the network that is specifically initiated by the mobile device user. Put differently, a request to communicate with the network that is initiated by the mobile device user is treated differently from automatic pinging by applications of the mobile device. In this regard, a request to communicate with the network may result in the user being redirected on their mobile device to a web-site that can provide replenishment or a modification of their account (i.e., subscription plan). Accordingly, a repeated pinging of the network by a mobile device that has met a predetermined account criterion is prevented, thereby saving network resources.

In a further example of a method of sending a notification message to a mobile device 13a in a communication network 21 regarding meeting a predetermined account criterion, an OCS 208 detects real-time mobile device 13a data usage and a present time. The OCS 208 accesses the account data for the mobile device 13a and determines a usage data limit. In one example, it also determines an account cycle. The account data is stored in the OCS 208 or in a separate server. A calculation is performed, based on the real-time mobile device data usage, the usage data limit, the present time, and the account cycle, to determine a current usage amount and a time remaining in the cycle. The data usage is calculated at the present time to determine whether the usage data limit has been exceeded. If there is an event corresponding to a trigger defined by allocated usage, the OCS 208 detects that event and generates a notification message for transmission via the network 35. For example, upon determining in real time that the current data usage limit is exceeded, a notification message is provided to the mobile device 13a with a suggestion to either replenish the account or to change to a different subscription plan. Further, the mobile device is prevented from pinging the network for communication unless it is initiated by the mobile device 13a user.

In one example, network 10 also includes a customer communications system 41, which is coupled for communication via the private network 35. The customer communications system 41 receives the notification request message from the OCS 208; and in response, generates and sends one or more notification messages. For example, the customer communications system 41 may generate and send the notification message in a PCO in the bearer channel to the mobile station 13a designated as that of the account holder and/or to the mobile other stations 13b to 13f that are on the account.

In one example, the carrier also offers its subscribers on-line access to a variety of functions related to the subscribers' accounts, such as review of billing statements and usage data, on-line payment, subscription changes, password control or the like. For that purpose, the carrier in our example operates a customer account web server 43, providing a subscriber interface via the Internet. Hence, a user's terminal, such as PC 31, may be used to access on-line information about a subscriber's account, which the mobile carrier makes available via the carrier's web site accessible through the Internet 29.

In the example of FIG. 1, when the OCS 208 detects account usage that meets a predetermined account criterion (e.g., exceeds a preset threshold level), it generates and sends a notification request message to the customer communication system 41. In one example, the OCS 208 itself sends one or more notification messages. However, by using a customer communication system 41, the workload on the data aggregator 208 is reduced and application of more sophisticated logic or 'business rules' to the notification messages regarding various types of usage and what is preferred by the various subscribers is facilitated. Accordingly, in the mobile communication network 10, the data aggregator 208 generates a request message for a notification message to be sent to the mobile station that a subscriber usage limit has been exceeded, and the OCS 208 sends that notification request message through the carrier's private network 35 to the customer communication system 41. The notification request from the OCS 208 to the customer communication system 41 is different from the notification message from the customer communication system 41 to the mobile device in that it does not include the additional logic or business rules that the customer communication system 41 provides.

The customer communication system 41 may be implemented on a single hardware platform. However, to provide effective notification services for a large number of customers and a large volume of trigger events, the customer communication system 41 for the associated example of usage notification service and other enterprise applications requiring notification may utilize a distributed system architecture.

FIG. 2 illustrates a high level interface block diagram depicting an exemplary system which provides network usage notification messages to a mobile device. For example, the System Architecture Evolution (SAE) 20 is the core network architecture of Third Generation Partnership Project's (3GPP's) Long Term Evaluation (LTE) wireless communication standard. The SAE 20 has a flat, all-IP architecture with separation of control plane and user plane traffic. The SAE 20 system includes eNodeB (eNB) 19, Mobility Management Entity (MME) 202, Home Subscriber Server (HSS) 204, and the Policy Control and Charging Rules Function (PCRF) 206, which are part of the network 35 of FIG. 2. As will be described in a later section, eNB 19 is an enhanced base station that acts as an interface between the mobile device and the mobile network. MME 202 is a control-node for the communication access network. For example, it is used for idle mode mobile device tracking and paging procedure including retransmissions. It also provides bearer channel activation/deactivation process and selection of the serving gateway (SGW) 212 for the mobile device (e.g., 13e). MME 202 also provides authentication of the user by interacting with the Home Subscriber Server (HSS) 204. The MME 202 also terminates the S6a interface towards the HSS 204 for roaming mobile devices 13e and 13f.

The Home Subscriber Server (HSS) 204 is a central database that contains user-related and subscription-related information. The HSS 204 provides features such as mobility management, call and session establishment support, user authentication and access authorization. For example, the HSS stores the Mobile Station International Subscriber Directory Number (MSISDN), the SIM-card identification information, and the like.

The Packet Data Network (PDN) Gateway (PGW) 107 provides connectivity from the mobile devices 13e and 13f to external packet data networks. It is a point of exit and entry of traffic for the mobile devices 13e and 13f of FIG. 2. The PGW server 107 monitors how much data is used by a mobile device (e.g., 13e, and 130 at any given time.

The Policy Control and Charging Rules Function (PCRF) 206 provides for policy control decision-making, as well as for controlling the flow-based charging functionalities in the Policy Control Enforcement Function (PCEF), which resides in the PGW 107. The PCRF 206 provides the QoS authorization that decides how certain data flow is treated in the PCEF and ensures that this is in accordance with the user's subscription profile.

The Online Charging System (OCS) server 208 provides real time credit control and charging for communication services. For example, it provides an account balance management function, credit control information, and allows a communications service provider to charge their customers, in real time, based on service usage. The OCS server 208, instructs the PGW server 107 how much data the user is allowed to use (e.g., data quota). The OCS determines whether a predetermined account criterion has been met.

The Serving Gateway (SGW) 212 routes and forwards data packets to the mobile devices 13e and 13f through the MME 202. For example, a data packet can include a notification message that an account threshold is exceeded. The SGW 212 manages and stores mobile device parameters of the IP bearer channel service, including network internal routing information.

Figure 4:
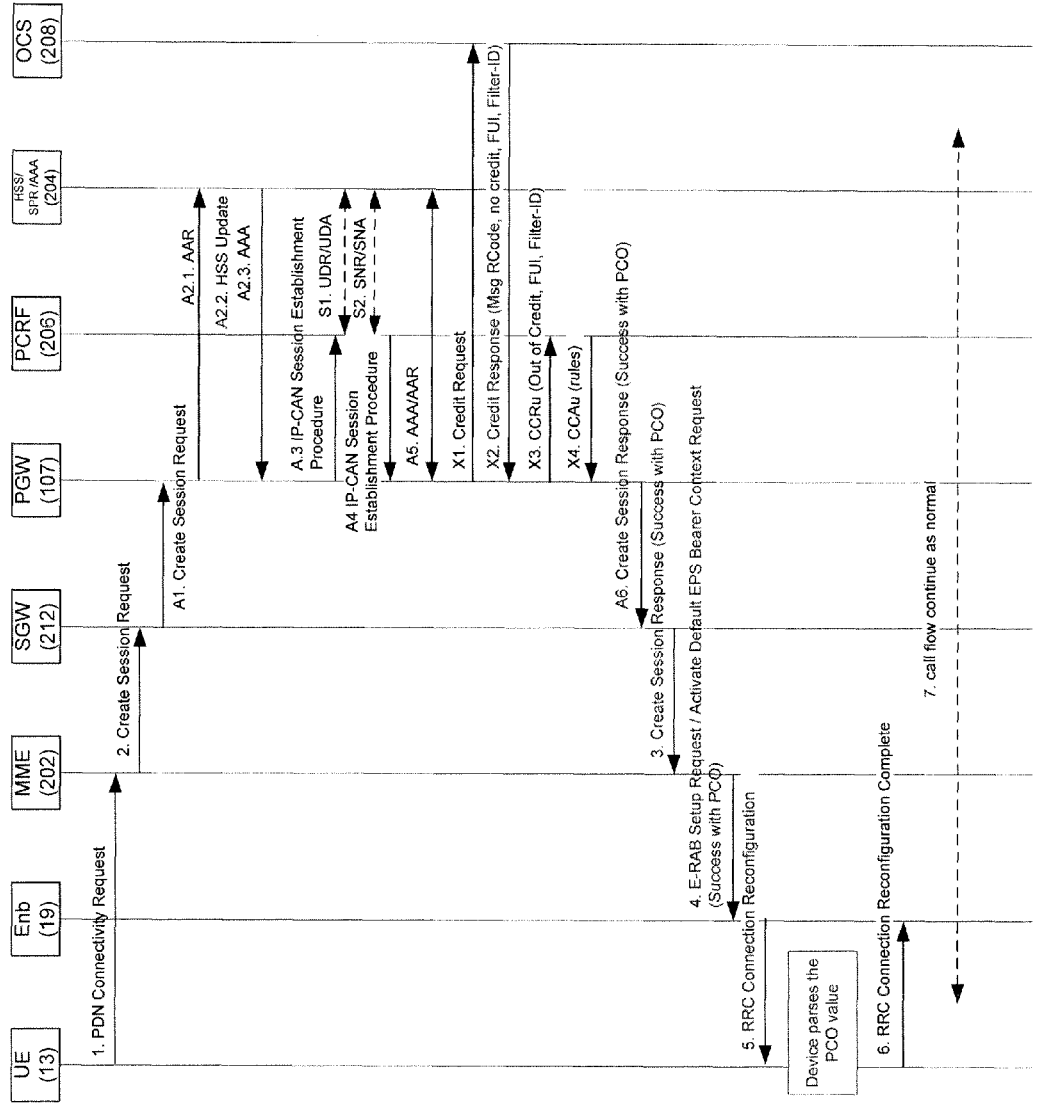
FIG. 4 illustrates an exemplary call flow of a new LTE session.

With the foregoing overview of the system, it may be helpful now to consider a high-level discussion of an example of a notification message of a mobile device and control of the network pinging thereof FIG. 4 illustrates an exemplary call flow of a 3GPP Long Term Evolution (LTE) session wherein a mobile device attempts to communicate with the network (i.e., a new call session).

In step 1, the mobile device (UE) 13 initiates a new PDN connection by sending a PDN Connectivity Request to the MME 202.

In step 2, the MME 202 sends a Create Session Request to the SGW 212 to create a data session.

In step A1, the SGW 212 forwards the Create Session Request to the HSS 204 server to create the data session.

In step A2.1, the PGW 107 sends an Authentication Authorization Request (AAR) to 3GPP Authentication, Authorization, and Accounting (AAA) server 204 to authorize the Internet APN for the subscriber. For example, server 204 provides authentication of the mobile device and/or user and determines if the mobile device and/or user is authorized to use a network service. Further, it accumulates accounting records that could be used for billing purposes. Although server 204 may physically be a single server, it can perform the functions of the AAA, Subscription Profile Repository (SPR), and HSS.

In step A2.2, the 3GPP AAA retrieves the profile for the mobile device from the HSS 204 server.

In step A2.3, the 3GPP AAA sends the retrieved subscriber profile from the HSS 204 server for the particular mobile device to the PGW 107 server.

In step A3, the PGW 107 server sends a Credit Control Request (CCR) to the PCRF 206 server to request policy information in connection with the mobile device.

If the PCRF 206 does not have the subscriber's subscription related information, in step S1, the PCRF 206 server sends a User Data Request (UDR) to the Subscription Profile Repository (SPR). In one example, the SPR is part of the HSS 204 server.

In step A4, the PCRF 206 sends back the policy and the QoS information to the PGW 107.

In step A5, the PGW 107 sends an Authentication Authorization Request (AAR) to the 3GPP AAA and receives an Authentication, Authorization, and Accounting (AAA) in response.

In step X1, the PGW 107 server sends a Credit Control Request to the OCS server 208 to obtain data quota therefrom. The OCS server 208 determines whether a predetermined account criterion has been met.

Perhaps it may be now be helpful to discuss the different roles the PGW 107 server and the OCS server 208 in determining whether an account criterion has been met. As discussed before, the PGW server 107 is part of the data path and monitors how much data is used at any given time. As to the OCS server 208, it instructs the PGW server 107 how much data the user is allowed to use. When the data quota is depleted, the PGW reports this depletion to the OCS and inquires whether additional quota is available. Thus, the PGW makes an initial determination that the data quota is depleted. The OCS makes the actual determination, as discussed below.

In step X2, the OCS server 208 provides a response to the PGW 107 server. For example, the response includes a Credit Control Response with a cause code, a Final Unit Indication (FUI), and a Filter-ID to indicate to the PGW 107 that the subscriber has no quota available. Thus, although the PGW makes the initial determination that a predetermined account criterion is met, it is in this step (in the OCS server 208) where the determination is made whether a predetermined account criterion is met. In this regard, the Filter-ID, and may provide the PGW the customer status with respect to whether it is a prepaid or postpaid type account, the usage criteria, and the related balance information.

In step X3, the PGW 107 server sends a credit notification to the PCRF 206 with FUI and Filter-ID.

In step X4, the PCRF 206 server provides special policy rules to the PGW 107 server. For example, different data rates may be applied and/or the mobile device could be redirected to account replenishment sites.

In step A6, the PGW 107 server processes the special policy rules it obtained from the PCRF 206 server. The PGW 107 server indicates to the SGW 212 server when the customer has no quota, returning a Create Session Response with the new PCO information with the relevant action code, as provided in FIG. 3.

In step 3, the SGW 212 server provides a Create Session Response to the MME 202 server with the PCO information.

In step 4, the MME 202 server sends Evolved Packet System Radio Access Bearer (E RAB) request (e.g., Activate Default EPS Bearer Context Request) to the eNodeB eNB (i.e., base station 19 from FIG. 1) which includes the PCO information. The eNB is an enhanced base station that acts as an interface between the mobile device and the mobile network. Node B is a term used in LTE to describe the components equivalent to the base transceiver system (BTS) in some mobile networks. Traditionally, a BTS is controlled by a Radio Network Controller (RNC). However, in later iterations of LTE, the NodeBs are enhanced with control functionality to effectively replace or eliminate the separate RNC. At least in some examples, NodeB is the equivalent of base station or BTS; and the term eNodeB or eNB stands for "evolved NodeB."

In step 5, the eNB sends a Radio Resource Control (RRC) connection re-configuration request to the mobile device (UE). The mobile device parses the PCO information to retrieve subscriber status and follows instructions therein. For example, when the mobile device (UE) receives the PCO information sent in the notification message from the network, the mobile device parses the information and interprets the instructions therein. Based on the action code obtained and the mobile device client, the mobile device can now block the IP protocol layer level and/or instruct the client to stop pinging the network. Further, the client on the mobile device may also disable the capability of applications to engage in any network traffic. Not only does the blocking preserve network resources, the battery consumption of the mobile device is reduced as well.

In step 6, the mobile device (UE) returns the RRC Connection Configuration Complete to the eNB, thereby acknowledging that the instructions have been successfully received.

In step 7, a regular call session is established. Alternatively, if a predetermined account criterion is met (e.g., an account threshold is exceeded), a regular call session is prevented. Accordingly, FIG. 4 describes a scenario in which a mobile device attempts to create a new network session and the determination of whether an account criterion has been met.

Figure 5:
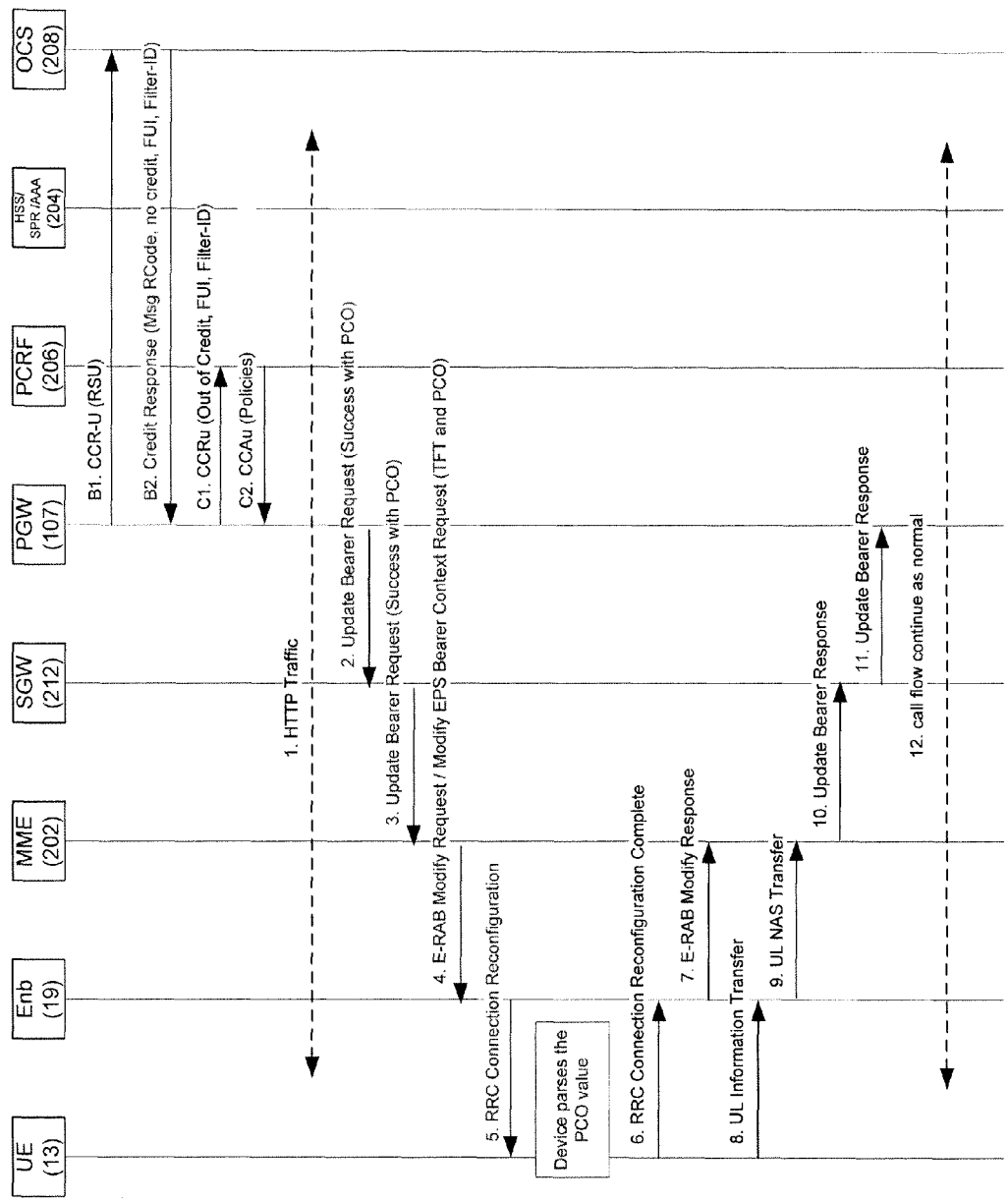
FIG. 5 illustrates an exemplary call flow where a data usage has met a predetermined criterion in the middle of an LTE session.

An account criterion can of course also be met in mid session. In this regard, FIG. 5 illustrates an exemplary call flow of a 3GPP Long Term Evolution (LTE) session where a mobile device continues to communicate with the network after having exceeded a usage limit. In step B1, the Packet Data Network (PDN) Gateway (PGW 107) server sends a Credit Control Request (CCR) to the OCS server 208 to request the data quota. As discussed before, the PGW 107 tracks data usage of the mobile device. The OCS server 208 has account information, including predetermined account criteria. At the beginning of the mobile device data session, the PGW 107 obtains the account criteria. Once the PGW 107 determines that a predetermined account criterion is met, the PGW 107 requests the account criteria again from the OCS server 208 to confirm that the account criterion has indeed been met. Thus, although the PGW makes the initial determination whether an account criterion is met, the OCS makes the actual determination that an account criterion has been met.

In step B2, the OCS responds to the PGW 107 server by providing a CCR with a cause code, Final Unit Indication (FUI) and Filter ID. In this example, the OCS indicates to the PGW 107 that the subscriber has met a predetermined criterion (e.g., has no quota available).

In step C1, the PGW 107 server provides a credit notification to the PCRF 206 with the FUI and Filter ID.

In step C2, after receiving the credit notification, the PCRF 206 responds to the PGW 107 by providing the special policy rules in connection with the account.

In step 1 of FIG. 5, the HTTP traffic continues. The session is allowed to continue because the mobile device (UE) 13 has not been notified yet. Accordingly, the mobile device has not been given an opportunity to cure having met at least one predetermined account criterion.

In step 2, the PGW 107 server processes the special policy rules. For example, the policy rules indicate that the mobile device met a predetermined account criterion (e.g., has no more quota). A Create Session Response is provided with new PCO information. The PCO includes a notification message that the mobile device has met a predetermined account criterion (e.g., exceeded at least one threshold limit of data usage). In one example, the PCO includes instructions to deactivate the network pinging by the mobile device if the account is not replenished or recharged. Accordingly, clients on the mobile device are prevented from automatically seeking network access. In one example, only user-initiated interactions with the network are allowed to reach the network.

In step 3, the SGW 212 server provides the Create Session Response to the MME 202. The response from the SGW 212 server to the MME 202 includes the PCO information.

In step 4, the MME 202 server sends an Evolved Packet System Radio Access Bearer (E RAB) setup request (e.g., to modify the EPS Bearer context request) to the eNodeB (eNB) that includes the PCO information.

In step 5, the eNB sends a Radio Resource Control (RRC) connection re-configuration request to the mobile device (UE). Thus, the mobile device receives the notification message through a PCO in a bearer channel of the wireless packet data. The mobile device parses the PCO information to retrieve subscriber status and follows instructions therein. For example, the PCO may include instructions to deactivate any network pinging from the mobile device. Further, the PCO may include instructions to only allow user-initiated interactions with the network. The mobile device may be provided a link (e.g., through pop-up) to a site to replenish/change the subscription plan.

In step 6, the mobile device (UE) returns the RRC Connection Configuration Complete to the eNB.

In step 7, the eNB acknowledges the bearer channel modification by sending a signal to the MME 202 with an E-RAB Modify Response.

In step 8, the mobile device (UE) Non Access Stratum (NAS) layer builds a NAS level Modify EPS Bearer Context Accept message and sends it inside the up-link (UL) Information Transfer (i.e., Modify EPS Bearer Context Accept) message to the eNB. The NAS protocols form the highest stratum of the control plane between the mobile device and the MME 202. NAS protocols support the mobility of the mobile device and the session management procedures to establish and maintain IP connectivity between the mobile device and the PDN and network gateways. In one example, the NAS also enforces roaming restrictions of the mobile device.

In step 9, the eNB sends an UL NAS Transfer (e.g., Modify EPS Bearer Context Accept) message to the MME 202 server.

In step 10, the MME 202 server sends the Update Bearer Response to the SGW 212 server.

Next, in step 11, the SGW 212 sends the Update Bearer Response to the PGW 107 server.

In step 12, the session continues as normal, providing communication between the mobile device and the network (i.e., network 21 of FIG. 1). For example, the user of the mobile device is able to continue to browse the internet, watch movies, place calls, etc.

Figure 6:
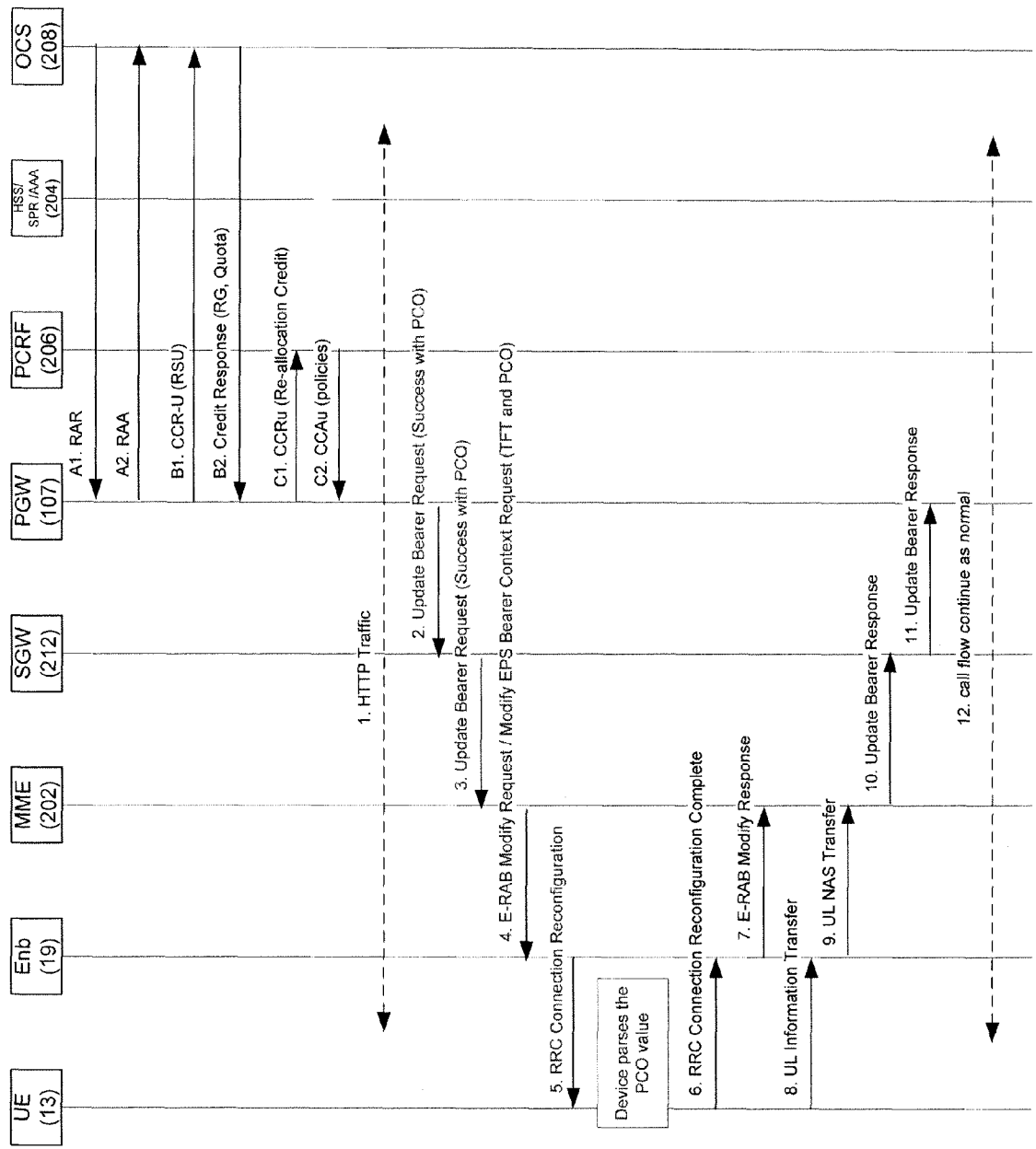
FIG. 6 illustrates an exemplary call flow where a mobile device replenishes its account in order to communicate with the network after having exceeded a usage limit.

A subscriber of a subscription plan can recharge their mobile device subscription plan in mid session. In this regard, FIG. 6 illustrates an exemplary call flow where a mobile device recharges its account in order to communicate with the network after having met an account criterion (e.g., usage limit). In step A1, the Online Charging System (OCS) server sends a Re-Authorization Request (RAR) to the Packet Data Network Gateway server (PGW 107).

In Step A2, the PGW 107 returns a Re-Authorization answer (RAA) to the OCS, thereby acknowledging the request.

In step B1, the PGW 107 sends a Credit Control Request Update (CCRU) to the OCS to determine the quota.

In step B2, the OCS responds to the PGW 107 by providing a quota associated with the Rating Group (RG) (i.e., specific service in connection with the account).

In step C1, the PGW 107 sends an event trigger to the PCRF 206 to notify that the recharge has occurred.

In step C2, the PCRF 206 responds by providing the policy rules to the PGW 107. For example, this response indicates that the account holder has sufficient (or insufficient) quota.

In step 2, the PGW 107 server processes the special policy rules, which indicates that the account holder has sufficient quota (e.g., has not met a predetermined account criterion). A Create Session Response is provided with new PCO information. The PCO includes a notification message that the mobile device has not exceeded any threshold limits of data usage (i.e., has not met a predetermined account criterion).

In step 3, the SGW 212 server returns the Update Bearer Request to the MME 202 server. The response from the SGW 212 server to the MME 202 server includes the PCO information.

In step 4, the MME 202 server sends an Evolved Packet System Radio Access Bearer (E RAB) modify request (e.g., to modify the EPS Bearer context request) to the eNodeB (eNB) which includes the PCO information.

In step 5, the eNB sends a Radio Resource Control (RRC) connection re-configuration request to the mobile device (UE). The mobile device parses the PCO information to retrieve subscriber status and follows instructions therein.

In step 6, the mobile device (UE) returns the RRC Connection Configuration Complete to the eNB.

In step 7, the eNB acknowledges the bearer channel modification by sending a signal to the MME 202 with an E-RAB Modify Response.

In step 8, the mobile device (UE) Non Access Stratum (NAS) layer builds a NAS level Modify EPS Bearer Context Accept message and sends it inside the UL Information Transfer (i.e., Modify EPS Bearer Context Accept) message to the eNB. The NAS protocols form the highest stratum of the control plane between the mobile device and the MME 202. NAS protocols support the mobility of the mobile device and the session management procedures to establish and maintain IP connectivity between the mobile device and the PDN and network gateways. In one example, the NAS also enforces roaming restrictions of the mobile device (UE) 13.

In step 9, the eNB sends an UL NAS Transfer (e.g., Modify EPS Bearer Context Accept) message to the MME 202 server.

In step 10, the MME 202 server sends the Update Bearer Response to the SGW 212 server.

Next, in step 11, the SGW 212 sends the Update Bearer Response to the PGW 107 server.

In step 12, the session continues as normal, providing communication between the mobile device and the network.

The quality of service (QoS) can be affected if a subscriber has met a predetermined account criterion. As discussed above, a bearer channel is an IP packet flow with a defined quality of service (QoS) between the Packet Data Network (PDN) Gateway (PGW 107) and the mobile device. The network-initiated QoS control paradigm specified in EPS is a set of signaling procedures for managing bearer channels and controlling their QoS assigned by the network. The EPS QoS concept is class-based, where each bearer channel is assigned one and only one QoS class identifier (QCI) by the network. The QCI is a scalar that is used within the access network as a reference to node-specific parameters that control packet forwarding treatment. This class-based approach, together with the network-initiated QoS control paradigm, gives network operators full control over the QoS provided for its offered services for each of its subscriber groups. In one example, when a subscription plan limit is met or exceeded, the QoS is lowered. Alternatively, the user of the mobile device may be prompted to change their subscription plan to a higher QoS.

Figure 7:
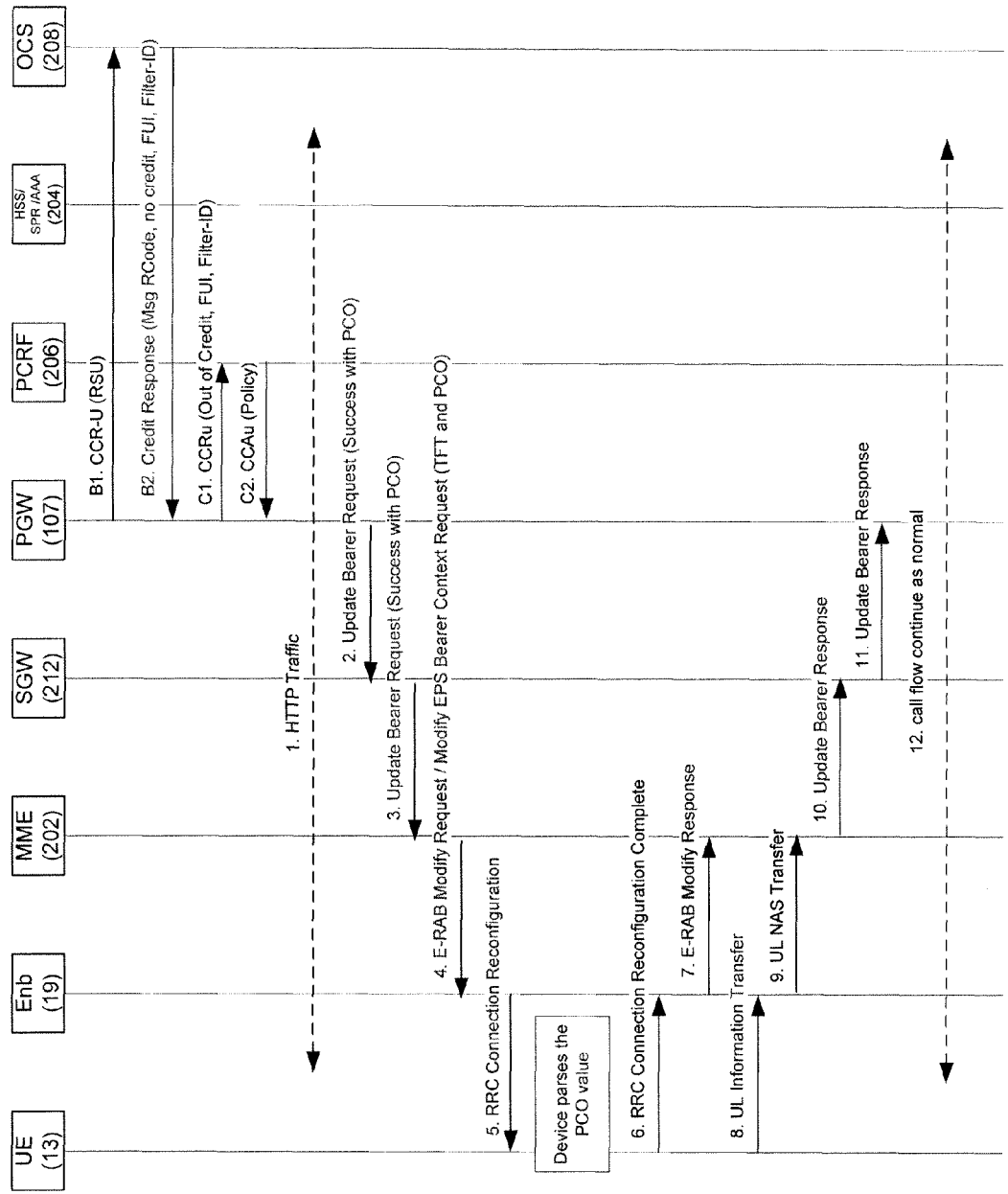
FIG. 7 illustrates an exemplary call flow wherein the QoS for a mobile device is changed.

FIG. 7 illustrates an exemplary call flow where the QoS for a mobile device is changed. FIG. 7 is substantially similar to the call flow described in the context of the discussion of FIG. 5 above and the corresponding steps are therefore not repeated here for brevity. One difference between FIG. 5 and FIG. 7 is that in FIG. 7 the information passed from the OCS (i.e., the filter ID and FUI) is different in terms of the special policy rules. For example, in step C2 of FIG. 7, a different QoS policy can be applied from the PCRF to the PGW.

The foregoing teachings are also compatible with Evolved High Rate Packet Data (eHRPD), which is a method that allows the mobile operator to upgrade their existing HRPD packet core network using elements of the SAE/EPC architecture. For example, eHRPD is an evolutionary path to LTE which provides seamless service mobility between the eHRPD and LTE networks. For example, eHRPD has the ability to provide seamless service mobility between High Rate Packet Data (HRPD) and LTE access networks with a single mobility management protocol. The operator can leverage the benefit of optimized handover (e.g., no dropped sessions and reduced handover latency) between LTE and eHRPD.

Figure 8:
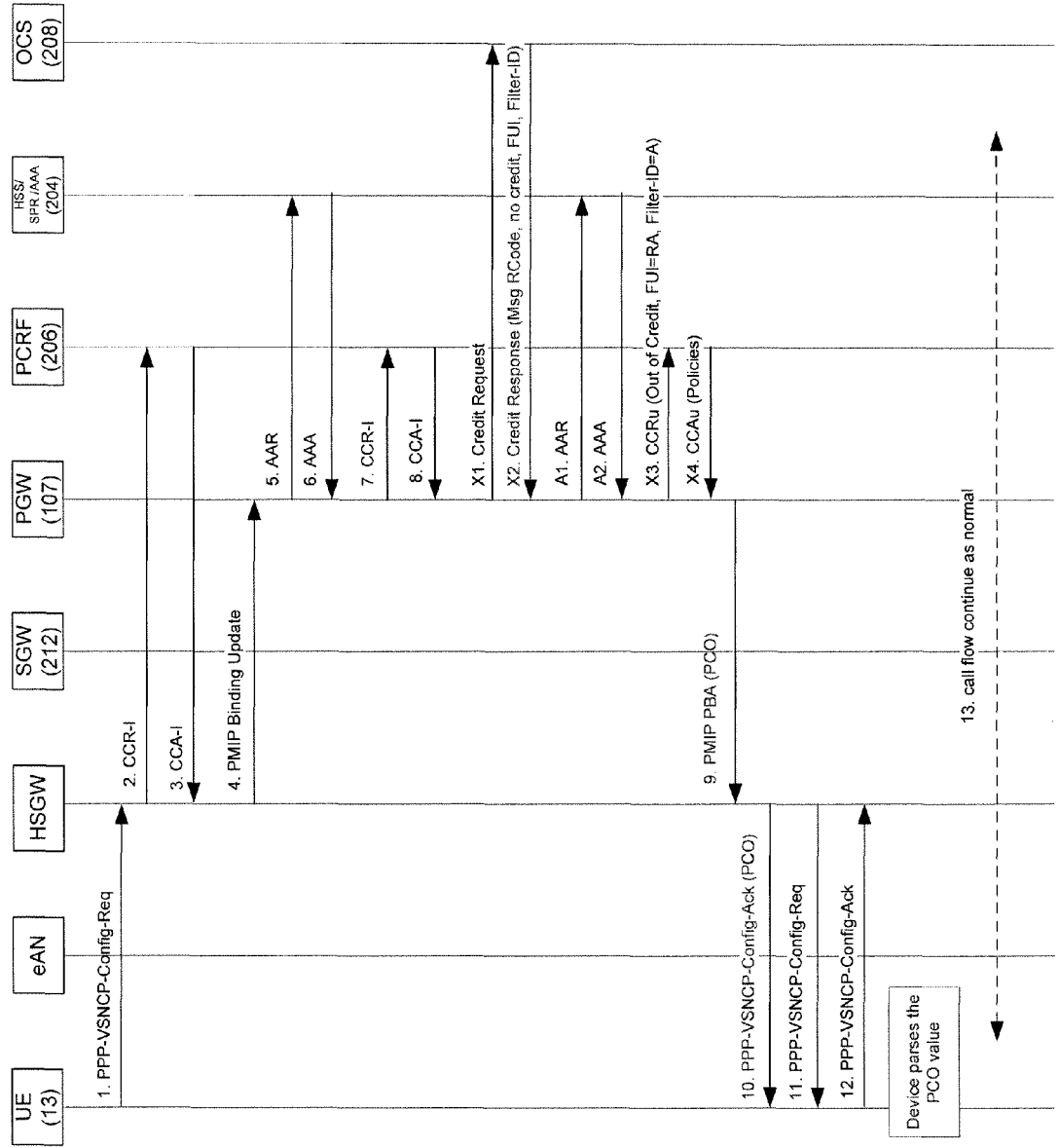
FIG. 8 illustrates an exemplary call flow wherein a user of a mobile device starts a new data session with the network in an eHRPD.

FIG. 8 illustrates an exemplary call flow wherein a user of a mobile device starts a new data session with the network in an eHRPD. In FIG. 8, a High Rate Packet Data Serving Gateway (HSGW) replaces the MME 202 of FIGS. 1 to 7.

In step 1, the user of the mobile device (UE) 13 initiates a Point to Point Protocol, Vendor-Specific Network Control Protocol Configuration (PPP-VSNCP-Config) request to the High Rate Packet Data Serving Gateway (HSGW) to start a new data session between the mobile device and the network.

In step 2, the HSGW sends a Credit Control Request Initial (CCR-I) to the PCRF 206 server.

In step 3, the PCRF 206 returns a Credit Control Answer Initial to the HSGW server.

In step 4, the HSGW sends a Proxy Mobile IPv6 (PMIPv6 or PMIP) Binding Update to the PGW 107 server. A PMIP is a standardized network protocol for building a common access technology independent of mobile core networks accommodating various access technologies, including 3GPP, 3GPP2, and WLAN based access architectures.

In step 5, the PGW 107 sends an Authentication Authorization Request (AAR) to Authentication, Authorization, and Accounting (AAA) to authorize the Internet APN for the subscriber.

In step 6, the 3GPP AAA sends the retrieved subscriber profile from the HSS 204 server for the particular mobile device to the PGW 107 server.

In step 7, the PGW 107 server sends a Credit Control Request Initial (CCR-I) request to the PCRF 206 server to request policy information in connection with the mobile device.

In step 8, the PCRF 206 sends back a Credit Control Answer Initial (CCA-I) and the policy to the PGW 107 server.

In step X1, the PGW 107 server sends a Credit Control Request to the OCS server to obtain data quota therefrom.

In step X2, the OCS server provides a response to the PGW 107 server. For example, the response includes a Credit Control Response with a cause code, a Final Unit Indication (FUI), and a Filter-ID to indicate to the PGW 107 that the subscriber has no quota available.

In step A1, the PGW 107 server sends an Authentication Authorization Request (AAR) to the 3GPP Authentication, Authorization, and Accounting (AAA) to authorize the Internet APN for the subscriber.

In step A2, the AAA responds with an AAA response to the PGW 107 server. At the same time (in step X3), the PGW 107 server sends a credit notification (CCRu) to the PCRF 206 server to indicate that a predetermined account criterion is met (e.g., data quota has been used up). In one example, the PCRF 206 server may implement a different policy by downgrading the QoS, redirection, or restriction.

In step X4, the PCRF 206 server provides special policy rules to the PGW 107 server, indicating that the user of the mobile device has run out of quota.

In step 9, the PGW 107 server processes the special policy rules. These policy rules indicate that an account criterion is met (e.g., the mobile device has no quota). In this regard the Proxy Mobile IPv6 (PMIPv6 or PMIP) is returned to the HSGW server with the new PCO information. In one example, special actions are included in the PCO. For example, the mobile device is instructed not to ping the network unless a request to access the network is specifically initiated by the mobile device user.

In step 10, the HSGW sends a Point to Point Protocol, Vendor-Specific Network Control Protocol Configuration Acknowledgment (PPP-VSNCP-Config-Ack) within the PCO information to the mobile device.

In step 11, the HSGW sends a PPP-VSNCP-Config Request to the mobile device (UE).

In step 12, the mobile device (UE) responds to the HSGW server with a PPP-VSNCP-Config-Ack. The mobile device parses the PCO information to retrieve subscriber status and follows instructions therein.

In step 13, the session continues as normal, providing communication between the mobile device and the network.

As shown by the above discussion, functions relating to providing network status information may be implemented on computers connected for data communication via the components of a packet data network, operating as the OCS 208 and/or as a Customer Communication System 41 as shown in FIG. 1. Although special purpose devices may be used, such devices also may be implemented using one or more hardware platforms intended to represent a general class of data processing device commonly used to run "server" programming so as to implement the network status information functions discussed above, albeit with an appropriate network connection for data communication.

Figure 9:
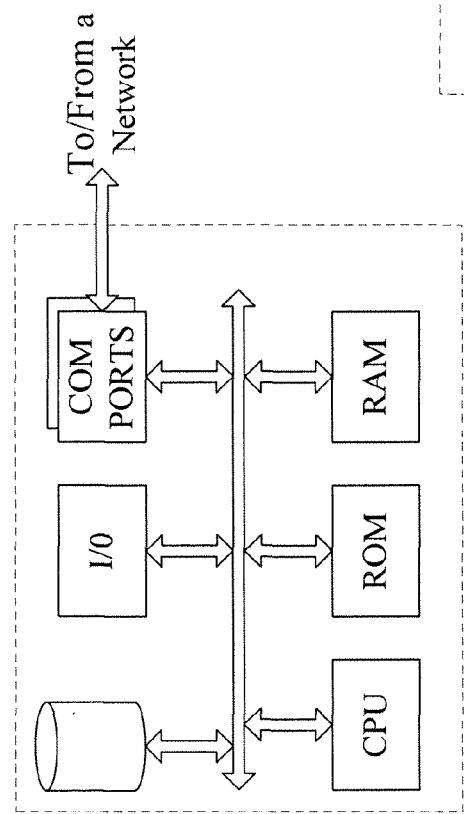
FIG. 9 illustrates a network or host computer.
Figure 10:
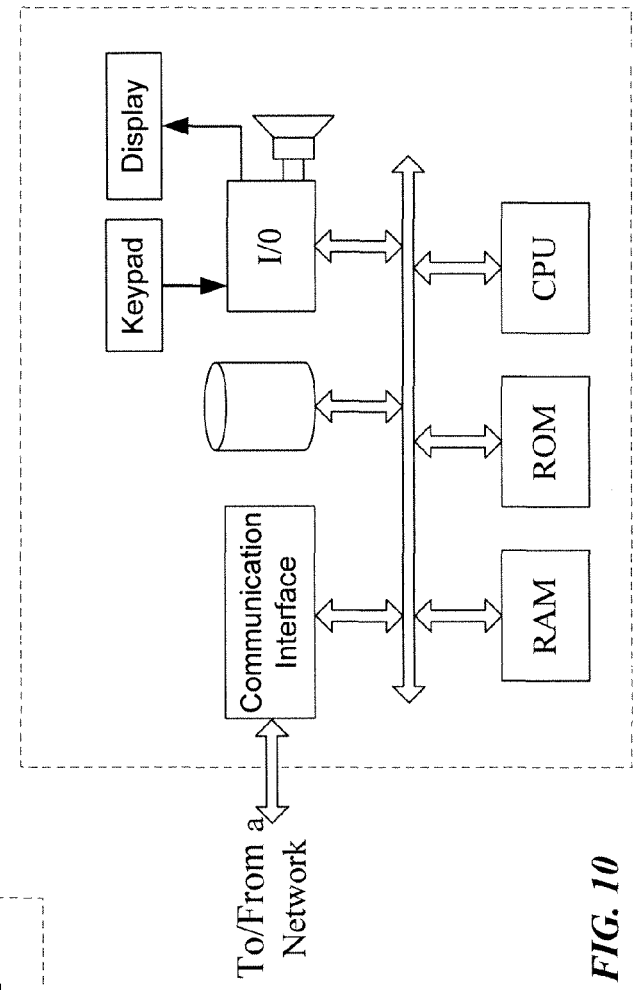
FIG. 10 illustrates a computer with user interface elements.

FIGS. 9 and 10 provide functional block diagram illustrations of general purpose computer hardware platforms. FIG. 9 illustrates a network or host computer platform, as may typically be used to implement a server. FIG. 10 depicts a device with user interface elements, as may be used to implement a personal computer, such as computer 31 of FIG. 1, or workstation or to implement a mobile device, such as a portable handset, a smart-phone, tablet computer, a personal digital assistant or other type of mobile station or mobile terminal device (e.g., devices 13a to 13f of FIGS. 1 and 2), although the device of FIG. 10 may also act as a server if appropriately programmed. It is believed that the general structure and general operation of such equipment as shown in FIGS. 9 and 10 should be self-explanatory from the high-level illustrations.

A general purpose computer configured as a server, for example, includes a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. In this case, such a platform would run server programming, for example, to provide account status information to the mobile device so as to function as one of the servers 208, 39, 41, and 43 in FIG. 1.

A user terminal such as a general-purpose personal computer or a mobile device typically comprises a central processor or other processing device, an internal communication bus, various types of memory or storage media (RAM, ROM, EEPROM, cache memory, disk or flash drives for mass storage, etc.) for code and data storage, and one or more network or communication interfaces or ports for communication purposes. The software functionalities involve programming, including executable code as well as associated stored data, e.g. files used for applications on the mobile device to process the instructions received from the network. The software code is executable by the mobile device. In operation, the code is stored within the mobile device. At other times, however, the software may be stored at other locations and/or transported for loading into the appropriate mobile device system. Execution of such code by a processor of the mobile device enables the mobile device to perform functions of receiving network instructions on the account status, in essentially the manner performed in the implementations discussed and illustrated herein.

Hence, aspects of the methods of receiving and processing network status information as outlined above may be embodied in programming. Program aspects of the technology may be thought of as "products" or "articles of manufacture" typically in the form of executable code and/or associated data that is carried on or embodied in a type of non-transitory machine readable medium.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Appendix: Acronym List

The description above has used a large number of acronyms to refer to various services, notification messages, and system components. Although generally known, use of several of these acronyms is not strictly standardized in the art. For the convenience of the reader, the following list correlates terms to acronyms, as used by way of example in the detailed description above.

3GPP2 —3'rd Generation Partnership Project 2
AAA—Authentication, Authorization, and Accounting
AAR—Authentication Authorization Request
AH—Account Holder
BS—Base Station
BTS—Base Transceiver System
CCA—Credit Control Answer
CCA-I—Credit Control Answer Initial
CCR—Credit Control Request
CCR-I—Credit Control Request Initial
CCRU—Credit Control Request Update
CPU—Central Processing Unit
EHRPD—Evolved High Rate Packet Data
EPC—Evolved Packet Core
EPS—Evolved Packet System
EPROM—Erasable Programmable Read Only Memory
EEPROM—Electrically Erasable Programmable Read Only Memory
eNB—Evolved Node B
E RAB—Evolved Packet System Radio Access Bearer
FLASH-EPROM—Flash Erasable Programmable Read Only Memory
FUI—Final Unit Indication
HRPD—High Rate Packet Data
HSGW—High Rate Packet Data Serving Gateway
HSS—Home Subscriber Server
ID—Identification
LTE—Long Term Evaluation
MD—Mobile Device
MME—Mobility Management Entity
MMSC—Multimedia Messaging Service Center
MSISDN—Mobile Station International Subscriber Directory Number
NAS—Non Access Stratum
OCS—Online Charging System
PCEF—Policy Control Enforcement Function
PCO—Protocol Configuration Option
PCRF—Policy and Charging Rules Function
PDN—Packet Data Network
PGW—Packet Data Network Gateway
PMIP—Proxy Mobile IPv6
PPP-VSNCP—Vendor-Specific Network Control Protocol Configuration
PROM—Programmable Read Only Memory
PSTN—Public Switched Telephone Network
QCI—Quality of Service Class Identifier
QoS—Quality of Service
RAM—Random Access Memory
RAN—Radio Access Network
RAR—Re-Authorization Request
ROM—Read Only Memory
RRC—Radio Resource Control
SAE—System Architecture Evolution
SGW—Serving Gateway
SIM—Subscriber Identity Module
SPR—Subscription Profile Repository
UL—Up Link
UDR—User Data Request
WAN—Wide Area Network

What is claimed is:

1. A method, comprising steps of:
tracking, on at least one server, a data usage of a mobile device through a wireless packet data communication network;
determining, from an account for the mobile device stored on the at least one server, a data usage criterion;
comparing, on the at least one server, the data usage to the data usage criterion; and
upon determining, based on the comparing, that the data usage has met the data usage criterion, sending a notification message of the data usage having met the data usage criterion from the at least one server to the mobile device in real time through a protocol configuration option (PCO) information element field within an existing message in a bearer channel of the wireless packet data communication network, the notification message comprising instructions to provide a plurality of options on a user interface of the mobile device by which to update the account, the plurality of options including at least two of
changing a Quality of Service (QoS) associated with the account,
changing the account to a different subscription plan from the provider, and
suspending service on the account until a next billing cycle begins.

2. The method of claim 1, wherein the notification message to the mobile device further comprises instructions to provide at least one option on a user interface of the mobile device to replenish the account.

3. The method of claim 2, wherein the instructions to provide the at least one option on the user interface to replenish the account instruct the mobile device to redirect the mobile device to a web site of an account provider where the at least one option is provided.

4. The method of claim 1, wherein the notification message to the mobile device further comprises instructions to cause the mobile device to deactivate or block transmission of automatic network access requests originating from the mobile device to the network.

5. The method of claim 4, wherein the instructions to cause the mobile device to deactivate or block transmission of automatic network access requests further configure the mobile device to allow user-initiated network access requests.

6. The method of claim 1, wherein the data usage criterion is one of at least (i) voice call minutes, (ii) data volume downloaded to the mobile device, or (iii) date and time the network is accessed.

7. The method of claim 1, wherein the notification message is provided to all mobile devices associated with the account.

8. The method of claim 1, further comprising providing, upon determining that the mobile device is different from a mobile device of an account holder, the notification message to the mobile device of the account holder in addition to the mobile device.

9. The method of claim 1, wherein the plurality of options on the user interface by which to update the account includes:
   changing a Quality of Service (QoS) associated with the account;
   changing the account to a different subscription plan from the provider; and
   suspending service on the account until a next billing cycle begins.

10. The method of claim 1, wherein the notification message of the data usage having met the data usage criterion includes at least one of:
    an indication that money on the account has run out;
    an indication that a data limit on the account has been reached; and
    an indication that the account is under a data restriction.

11. The system of claim 1, wherein the plurality of options on the user interface by which to update the account includes:
    changing a Quality of Service (QoS) associated with the account;
    changing the account to a different subscription plan from the provider; and
    suspending service on the account until a next billing cycle begins.

12. A computer system configured as at least one server, the computer system comprising:
    a processor;
    a network interface coupled to the processor configured to enable communications via a communication network;
    a storage device for content and programming;
    a program stored in the storage device, wherein execution of the program by the processor configures the computer system to perform functions, including functions to:
        track a data usage of a mobile device through a wireless packet data communication network;
        determine, from an account for the mobile device stored on the storage device, a data usage criterion;
        compare the data usage to the data usage criterion; and
        upon determining, based on the comparing, that the data usage has met the data usage criterion, send a notification message of the data usage having met the data usage criterion from the at least one server to the mobile device in real time through a protocol configuration option (PCO) information element field within an existing message in a bearer channel of the wireless packet data communication network, the notification message comprising instructions to provide a plurality of options on a user interface of the mobile device by which to update the account, the plurality of options including at least two of
            changing a Quality of Service (QoS) associated with the account,
            changing the account to a different subscription plan from the provider, and
            suspending service on the account until a next billing cycle begins.

13. The system of claim 12, wherein the notification message to the mobile device further comprises instructions to provide at least one option on a user interface of the mobile device to replenish the account.

14. The system of claim 13, wherein the instructions to provide the at least one option on the user interface to replenish the account instruct the mobile device to redirect the mobile device to a web site of an account provider where at least one option is provided.

15. The system of claim 12, wherein the notification message to the mobile device further comprises instructions to cause the mobile device to deactivate or block transmission of automatic network access requests originating from the mobile device to the network.

16. The system of claim 15, wherein the instructions to cause the mobile device to deactivate or block transmission of automatic network access requests further configure the mobile device to allow user-initiated network access requests.

17. The system of claim 12, wherein the data usage criterion is one of at least (i) voice call minutes, (ii) data volume downloaded to the mobile device, or (iii) date and time the network can be accessed.

18. The system of claim 12, wherein the notification message is provided to all mobile devices associated with the account.

19. The system of claim 12, wherein the functions further include a function to provide, upon determining that the mobile device is different from a mobile device of an account holder, the notification message to the mobile device of the account holder in addition to the mobile device.

20. The system of claim 12, wherein the notification message of the data usage having met the data usage criterion includes at least one of:
    an indication that money on the account has run out;
    an indication that a data limit on the account has been reached; and
    an indication that the account is under a data restriction.

* * * * *